Nov. 8, 1955  E. E. SCHIESEL  2,723,004

OIL CUP ADAPTOR UNITS

Filed Aug. 1, 1951

INVENTOR.
ERVIN E. SCHIESEL

BY
H. G. Manning

ATTORNEY.

2,723,004
Patented Nov. 8, 1955

2,723,004

OIL CUP ADAPTOR UNITS

Ervin E. Schiesel, Meriden, Conn., assignor to The Mattatuck Mfg. Co., Waterbury, Conn., a corporation of Connecticut Application August 1, 1951, Serial No. 239,647

1 Claim. (Cl. 184—14)

This invention relates to oil cup fittings used in the lubrication of machinery, and pertains more particularly to the use of different fittings or adaptors in conjunction with standard or basic ball valve oil cups for economically equipping various kinds of machinery with said basic cups.

It is usual in the construction of various kinds of machinery, motors, etc., to use different types of oil cup units—the type used depending upon the location and size of the bearing and other parts to be lubricated. Such a procedure necessitates either maintaining in stock a large inventory of many kinds of oil cup units, or manufacturing specially a particular oil cup unit for each particular application.

Accordingly, it is an object of this invention to provide a plurality of fittings or adaptors with which basic types of oil cups may be used, and which are of various constructions, so as to be adaptable for use in any type of lubrication.

It is another object to provide adaptors of the character described which may be inexpensively manufactured by automatic machinery.

Another object of this invention is to reduce the cost of fitting different bearings with oil cups by providing simple, efficient, inexpensive means for adapting standard oil cup units to all applications.

A further object is to provide a device of the above nature which will be simple in construction, easy to install and manipulate, ornamental in appearance, compact, and very efficient and durable in use.

With these and other objects in view, there have been illustrated on the accompanying drawings several forms in which the invention may be conveniently embodied in practice.

Figure 1:
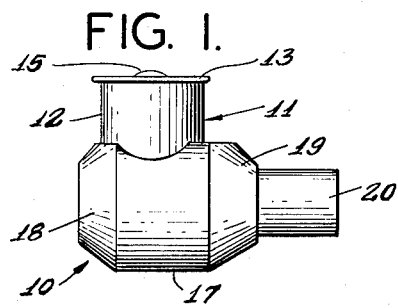
Fig. 1 illustrates a side elevational view of the first form of the improved adaptor unit, the same being shown equipped with a basic oil cup.

Referring now to the drawings, in which like reference numerals denote corresponding parts throughout the several views, the numeral 10 designates generally one form of the adaptor unit embodying the invention, the same being fitted with a "basic" standard ball valve drive oil cup 11.

The oil cup 11 is of known construction and in common use, and, therefore, constitutes no part of the present invention. As clearly shown in Fig. 2, the basic oil cup 11 comprises a cylindrical shell 12 provided with a centrally apertured, integrally formed concave top cover 13 and an annular bottom apertured seat portion 14. A ball 15 is seated against the inside of the cover 13 so as normally to close its aperture, being pressed thereagainst by a barrel-shaped compression spring 16 disposed within the shell 12 and acting against the underside of the ball and the seat portion 14.

The adaptor unit 10, preferably machined from cylindrical stock, comprises a body portion 17, tapered at one end as indicated at 18, and likewise tapered at its other end as indicated at 19. The tapered end 19 extends outwardly in the form of a coaxial, cylindrical reduced nipple portion 20. The top of the body portion 17 is vertically drilled to form therein a cylindrical recess 21 having a conical bottom portion 22. A longitudinal horizontal cylindrical opening 23 is drilled coaxially through the nipple portion 20 to communicate with the conical bottom portion 22 of the recess 21. The cylindrical recess 21 is of such a diameter as to frictionally retain therein the basic oil cup 11 with a drive fit.

Figure 3:
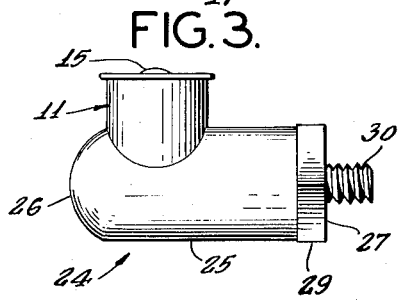
Fig. 3 illustrates a side elevational view of a second form of improved adaptor unit, also equipped with a basic oil cup.
Figure 4:
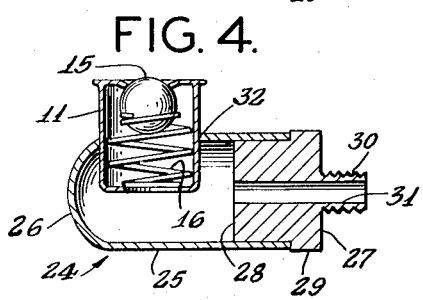
Fig. 4 is a vertical cross-sectional view of the same.

The numeral 24 in Figs. 3 and 4 indicates generally the second form of the adaptor unit also fitted with basic oil cup 11, said adaptor unit comprising a drawn cylindrical shell 25 hemispherically domed at one end as indicated by the numeral 26, and fitted at its other end with a nipple member 27 comprising a reduced cylindrical plug portion 28 frictionally fitted within said cylindrical shell 25. The nipple member 27 has an annular shoulder portion 29 seated against the end of the cylindrical shell 25, and an outwardly-extending, coaxially-disposed, externally-threaded nipple portion 30 of reduced diameter. The nipple member 27 has a coaxially drilled hole as indicated by the numeral 31. The top of the shell 25 is provided with a round drilled vertical opening 32, within which is frictionally retained the basic oil cup 11.

Figure 5:
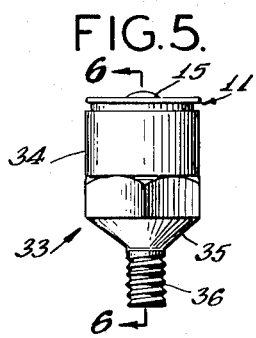
Fig. 5 represents an elevational view of a third form of improved adaptor unit, also shown equipped with a basic oil cup.
Figure 6:
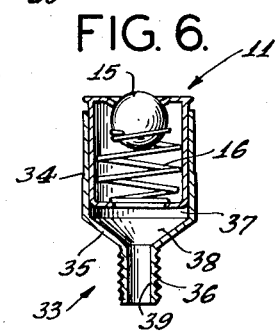
Fig. 6 is a vertical cross-sectional view of the same.

Referring to Figs. 5 and 6, the numeral 33 indicates generally the third form of adaptor unit "drive" fitted with the basic oil cup 11, said adaptor being made of hexagonal metal stock and comprising an upstanding cylindrical shell portion 34, having at its lower end a coaxially formed tapered section 35 terminating in a downwardly-extending, externally-threaded, vertical nipple portion 36. The upper end of the body portion 34 is drilled to form a cylindrical recess 37 terminating at its lower end in a conical recess 38. The nipple portion 36 is vertically drilled, to form a coaxial passage 39 communicating with the conical recess 38. The basic oil cup 11 is force-fitted within the cylindrical recess 37, whereby it is securely held therein by frictional contact.

Figure 7:
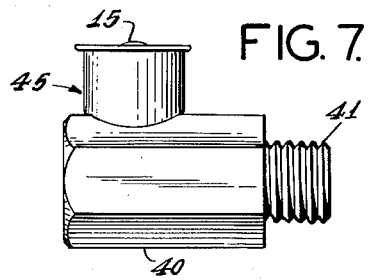
Fig. 7 represents a side elevational view of a fourth form of improved adaptor unit equipped with a stepped basic oil cup.
Figure 8:
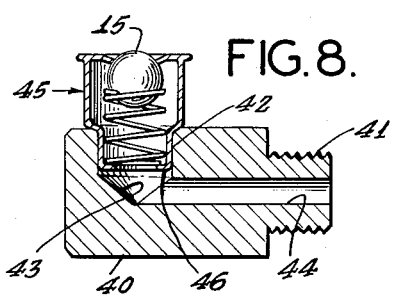
Fig. 8 is a vertical cross-sectional view of the same.

Figs. 7 and 8 illustrate the fourth form of adaptor, the same comprising a horizontally-extending hexagonal body portion 40 integrally formed at one end with a coaxial outwardly-extending, externally threaded nipple portion 41 of reduced diameter. The body portion 40 is provided at its top with a vertically-drilled cylindrical recess 42 terminating in a conical recess portion 43. The nipple portion 41 and the body portion 40 are provided with an axially drilled small horizontal passage 44 communicating with the conical recess portion 43. An oil cup 45, similar to the basic oil cup 11 but provided with a cylindrical lower end portion 46 of reduced diameter, has said lower end portion seated and frictionally retained within the cylindrical recess 42.

It is to be noted that with the modified "stepped" basic oil cup 45, an adaptor may be employed having a diameter less than the greater diameter of the oil cup.

Figure 9:
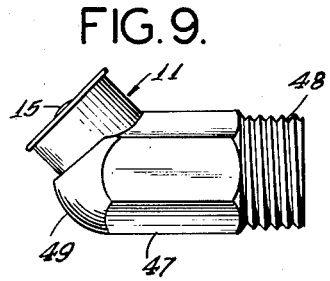
Fig. 9 is a side elevational view of a fifth form of improved adaptor unit, equipped with a basic oil cup located in an inclined position.
Figure 10:
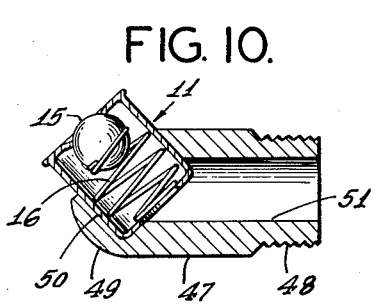
Fig. 10 is a vertical cross-sectional view of the same.

Figs. 9 and 10 illustrate the fifth form of adaptor, the same comprising a horizontally extending body portion 47, formed of hexagonal stock and externally threaded at one end thereof, as indicated at 48. The other end of the body portion 47 is rounded at its lower side as indicated by the numeral 49 and obliquely drilled at its upper side to form a cylindrically walled recess 50. The body portion 47 is centrally drilled to form a horizontal passage 51 extending from the recess 50 through its threaded end 48. Seated in and securely frictionally retained within the recess 50 by a force fit is a basic oil cup 11.

*Operation.*

It will be noted that each of the five various forms of adaptor unit illustrated in Figs. 1 through 10 is provided at one end with a cylindrical bore within which is force fitted a standard or basic oil cup, and at the other end with means for connecting to the bearing or other part to be lubricated.

Figure 2:
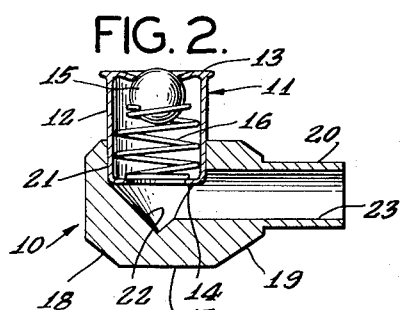
Fig. 2 is a vertical cross-sectional view of the same.

Though the connecting means is illustrated in Figs. 3 through 10 as being externally threaded, it is to be understood, of course, that these modifications could alternatively be provided with smooth connection portions similar to that illustrated in Figs. 1 and 2, for frictional engagement within a complementary bored opening provided in the bearing within the spirit and scope of the present invention.

One advantage of the present invention is that various types of fittings or adaptors employing basic types of oil cups may selectively be used as desired.

While there have been disclosed in this specification several forms in which the invention may be embodied, it is to be understood that these forms are shown for the purpose of illustration only, and that the invention is not to be limited to the specific disclosures, but may be modified and embodied in various other forms without departing from its spirit. In short, the invention includes all the modifications and embodiments coming within the scope of the following claim.

Having thus fully described the invention, what is claimed as new, and for which it is desired to secure Letters Patent, is:

An oil cup adaptor unit comprising a nipple member of solid thick material and a cylindrical sheet metal body member open at one end and closed at the other end, said body member being provided on one side with a cylindrical opening for frictionally and detachably fitting about a self-contained self closing cylindrical oil cup to be disposed at right angles to the axis of the body member, said nipple member being provided with a reduced cylindrical section terminating in an annular shoulder receiving said open end of the body member with a tight force fit in abutting engagement with said shoulder.

References Cited in the file of this patent

UNITED STATES PATENTS

| | | |
|---|---|---|
| 693,927 | Tucker | Feb. 25, 1902 |
| 1,251,167 | Bacon | Dec. 25, 1917 |
| 1,288,488 | Bold | Dec. 24, 1918 |
| 1,366,065 | Davis | Jan. 18, 1921 |
| 1,632,985 | Zerk | June 21, 1927 |
| 1,645,889 | Zerk | Oct. 18, 1927 |
| 1,711,905 | Piquerez | May 7, 1929 |

FOREIGN PATENTS

| | | |
|---|---|---|
| 7,590 | Great Britain | June 5, 1886 |